(12) United States Patent
Hetherington (10) Patent No.: US 10,184,516 B2
(45) Date of Patent: Jan. 22, 2019

(54) BEARING SYSTEM AND METHOD

(71) Applicant: Primetals Technologies, Limited, London (GB)

(72) Inventor: Adrian Hetherington, Worksop (GB)

(73) Assignee: PRIMETALS TECHNOLOGIES, LIMITED (GB)

( * ) Notice: Subject to any disclaimer, the term of this patent is extended or adjusted under 35 U.S.C. 154(b) by 0 days.

(21) Appl. No.: 15/561,092

(22) PCT Filed: Apr. 6, 2016

(86) PCT No.: PCT/EP2016/057528
§ 371 (c)(1),
(2) Date: Sep. 25, 2017

(87) PCT Pub. No.: WO2016/165995
PCT Pub. Date: Oct. 20, 2016

(65) Prior Publication Data
US 2018/0119734 A1    May 3, 2018

(30) Foreign Application Priority Data
Apr. 14, 2015  (GB) .................................. 1506277.1

(51) Int. Cl.
*F16C 35/063*  (2006.01)
*F16C 19/18*  (2006.01)
(Continued)

(52) U.S. Cl.
CPC ............ *F16C 19/182* (2013.01); *F16C 19/14* (2013.01); *F16C 19/364* (2013.01);
(Continued)

(58) Field of Classification Search
CPC . F16C 35/063; F16C 2226/74; F16C 2322/12
See application file for complete search history.

(56) References Cited

U.S. PATENT DOCUMENTS 3,413,022 A * 11/1968 Waddell ............... F16B 21/183
                                                        285/323
3,627,388 A   12/1971 Jennings et al. ............. 308/37
(Continued)

FOREIGN PATENT DOCUMENTS

CN        102027253 A      4/2011
CN        102472316 A      5/2012
(Continued)

OTHER PUBLICATIONS

International Search Report dated May 23, 2016 in corresponding PCT International Application No. PCT/EP2016/057528.
(Continued)

*Primary Examiner* — Thomas R Hannon
(74) *Attorney, Agent, or Firm* — Ostrolenk Faber LLP (57) ABSTRACT

A bearing system includes: a rotatable shaft, a circumferential channel in the shaft with an axially extending profile surface at least part of which is inclined relative to the shaft axis; a bearing, around the shaft in use; a split ring in the circumferential channel in contact with the inclined profile surface, the split ring includes a first part having an outer diameter, and a second part having a greater outer diameter than the first part to provide a thrust surface; a collar, including an internal bore to accommodate the first part of the split ring in use; and a bearing locator for exerting an axial locating force between the split ring and the bearing to locate the bearing on the shaft. An axial thrust load exerted on the split ring by the shaft is transmitted to the collar by the thrust surface, and the split ring is urged along the inclined profile surface so as to produce a radial load on the split ring which is resisted by the collar.

13 Claims, 8 Drawing Sheets

(51) Int. Cl.
*F16C 19/14* (2006.01)
*F16C 19/36* (2006.01)

(52) U.S. Cl.
CPC ........ *F16C 35/063* (2013.01); *F16C 2226/74* (2013.01); *F16C 2322/12* (2013.01)

(56) References Cited

U.S. PATENT DOCUMENTS

| | | | | |
|---|---|---|---|---|
| 3,782,796 | A | | 1/1974 | Rickley et al. ............... 308/234 |
| 4,012,154 | A | * | 3/1977 | Durwin ................... F16D 1/09 |
| | | | | 384/542 |
| 4,019,824 | A | | 4/1977 | Percy ............................ 403/261 |
| 4,182,578 | A | | 1/1980 | Livesay et al. ............... 403/317 |
| 5,411,337 | A | * | 5/1995 | Bianco .................. B21B 31/07 |
| | | | | 384/519 |
| 5,857,783 | A | * | 1/1999 | Johansson ............... B21B 31/07 |
| | | | | 384/537 |
| 6,132,101 | A | * | 10/2000 | Landy, III ............... B21B 31/07 |
| | | | | 384/559 |
| 8,801,293 | B2 | | 8/2014 | Wendeberg |
| 9,249,782 | B2 | * | 2/2016 | Minadeo ............. F03D 11/0008 |
| 9,434,209 | B2 | | 9/2016 | Umekida |
| 2012/0134617 | A1 | | 5/2012 | Keller |

FOREIGN PATENT DOCUMENTS

| | | |
|---|---|---|
| CN | 104136236 A | 11/2014 |
| DE | 1 754 732 U | 10/1957 |
| GB | 2 118 640 A | 11/1983 |
| WO | WO 79/00828 A1 | 10/1979 |
| WO | WO 90/14524 A1 | 11/1990 |

OTHER PUBLICATIONS

Written Opinion dated May 23, 2016 in corresponding PCT International Application No. PCT/EP2016/057528.
Combined Search and Examination Reported dated Jul. 30, 2015 in corresponding United Kingdom Patent Application No. GB 1506277.1.
Chinese Office Action, dated Aug. 31, 2018, issued in corresponding Chinese Patent Application No. 201680021817.4. Includes English translation. Total 21 pages.

* cited by examiner

BEARING SYSTEM AND METHOD

CROSS-REFERENCE TO RELATED APPLICATIONS

The present application is a 35 U.S.C. §§ 371 national phase conversion of PCT/EP2016/057528, filed Apr. 6, 2016, which claims priority of United Kingdom Patent Application No. 1506277.1, filed Apr. 14, 2015, the contents of which are incorporated by reference herein. The PCT International Application was published in the English language.

TECHNICAL FIELD

The present invention relates to a bearing system and a method of assembling a bearing system.

TECHNICAL BACKGROUND

In a rolling mill, work roll shafts are rotatably supported by bearings. Once bearings have been fitted to a work roll shaft, they must be located axially and the axial location must be able to withstand the anticipated axial thrust forces from the shaft.

Figure 1:
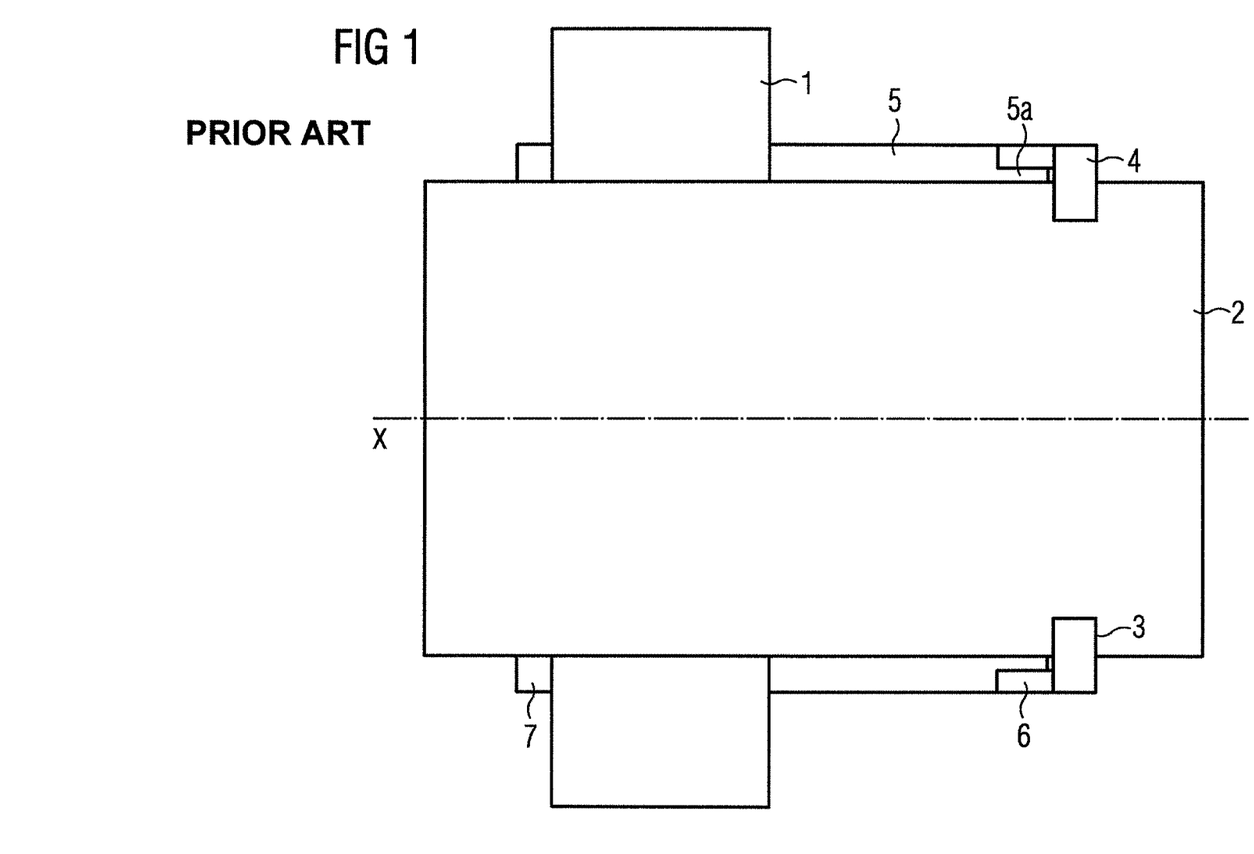
FIG. 1 shows a simplified sectional view of a conventional bearing system in an assembled condition.

As shown in FIG. 1, a conventional arrangement for axial location of a bearing 1 on a work roll shaft 2 having a longitudinal axis X in a circumferential rectangular groove 3 which is cut into the shaft, with radii in the corners, and into which a split ring 4 is inserted. The two halves of the split ring 4 are connected together, for example by a pivot at one side and by a bolt at the other side, so that the assembled ring is slipped over the shaft 2 and then the bolt is inserted to hold the split ring 4 together. A bearing retaining sleeve 5 having a threaded end 5a is tightened against the side of the split ring 4 by a threaded collar 6, forcing the split ring 4 axially against the outer face of the groove 3, while simultaneously holding the inner race of the axial bearing 1 against an abutment face 7, which may be a spacer or a neck ring of the shaft 2. This securely locates the bearing 1 onto the roll shaft 2.

One unintended consequence of this arrangement is to weaken the work roll shaft. Not only is the shaft cross-section reduced, but also the shape of the profile gives rise to stress concentrations. This can lead to premature failure due to fatigue. As the market moves toward wider rolling mills with correspondingly greater torque values, this is a growing problem.

BRIEF DESCRIPTION OF THE INVENTION

The present invention aims to alleviate at least to some extent this problem of the prior art.

According to an aspect of the invention, there is provided a bearing system, comprising: a shaft, having a longitudinal axis about which the shaft can rotate, the shaft including a circumferential channel comprising an axially extending profile surface at least part of which is inclined relative to the longitudinal axis; a bearing, configured to be disposed around the shaft in use; a split ring, configured to be located in the circumferential channel in use so as to be in contact with the inclined profile surface, the split ring including a first part having a first outer diameter, and a second part having a greater second outer diameter than the first part so as to provide a thrust surface; a collar, including an internal bore configured to accommodate the first part of the split ring in use; and a bearing locator, configured to exert an axial locating force between the split ring and the bearing in order to locate the bearing on the shaft; wherein in use, an axial thrust load exerted on the split ring by the shaft is transmitted to the collar by the thrust surface, and the split ring is urged along the inclined profile surface so as to produce a radial load on the split ring which is resisted by the collar.

In use, the axial thrust load, exerted on the split ring by the channel of the shaft, is transmitted to the collar by the thrust surface. Since the channel has an axially-extending profile surface, at least part of which is inclined to the longitudinal axis of the shaft, the split ring is urged to ride over the inclined profile surface and so experiences a radial force which attempts to expand the split ring radially. The surrounding collar provides radial containment of the split ring, thereby preventing the split ring from moving axially, or at least limiting its axial movement, and keeping the bearing correctly located on the shaft. Thus, the collar transmits the axial load to secure the bearing and simultaneously contains the radial expansion force imposed on it by the split ring. The provision of the inclination or slope in the profile surface of the circumferential channel is beneficial because it reduces the overall stress concentrations in the shaft in the vicinity of the channel. Depending on the shape of the inclined surface, the peak stress may be reduced by 50% in comparison with a conventional, substantially square-section, channel.

The part of the profile surface of the channel, which is in contact with the split ring and takes the thrust load and provokes radial expansion of the split ring, is inclined or sloping in the sense that it is not at right angles to or parallel with the longitudinal axis of the shaft. Other parts of the profile surface of the channel, that is the non-contact/non-thrust parts which do not cause the radial expansion, may be parallel with or at right angles to the longitudinal axis. A part of the profile surface which is parallel with the longitudinal axis might or might not be in contact with the split ring—but either way this part could not transmit any thrust load.

The bearing locator and the collar may comprise a single element. Alternatively, the bearing locator and the collar may comprise separate elements. The bearing locator may comprise: a threaded spacer, configured to be disposed between the bearing and the circumferential channel; and a nut, configured to be screwed on the threaded spacer into abutment with the collar so as to exert the axial locating force. The threaded spacer may be configured such that the nut and the collar can be disposed on the threaded spacer within the axial length of the threaded spacer, so that the split ring can be located in the circumferential channel adjacent the threaded spacer on the shaft.

The inclined profile surface of the circumferential channel may be straight. Alternatively, the inclined profile surface of the circumferential channel may be curved. Alternatively, the inclined profile surface of the circumferential channel may be partly straight and partly curved. The radius of curvature may be constant. Alternatively, the radius of curvature may be varied. The profile surface, or a tangent to the profile surface, may be inclined from the longitudinal axis of the shaft by about 1 to 80 degrees, preferably about 1 to 45 degrees, more preferably about 1 to 30 degrees.

It will be understood that the profile of the channel may take any general shape, provided that the profile is configured such that the split ring will experience a radial force when it is subjected to the shaft axial load. This will be the case as long as the profile surface has some inclination or slope in the axial direction relative to the longitudinal axis of the shaft and the split ring is in contact with the inclined surface. That is, at least some part of the profile (or a tangent to the part of the profile) forms an angle with the longitudinal axis of the shaft which has a value which is greater than 0 and less than 90 degrees. Put another way, the profile comprises a surface which is inclined both to the longitudinal axis of the shaft, and to an imaginary line which is normal to the longitudinal axis of the shaft. Accordingly, the profile of the channel may be entirely curved, or partly curved, or comprise at least one straight and inclined portion, or comprise a series of straight portions which together comprise a general curve.

According to another aspect of the invention, there is provided a method of assembling a bearing system as described herein above, comprising: positioning the bearing onto the shaft; positioning the bearing locator onto the shaft; positioning the collar over the bearing locator; positioning the split ring at least partially in the circumferential channel; positioning the collar over the first part of the split ring; and adjusting the bearing locator so as to exert the axial locating force between the split ring and the bearing in order to locate the bearing on the shaft.

BRIEF DESCRIPTION OF THE DRAWINGS

Embodiments will now be described, by way of example, with reference to the accompanying figures in which.

DESCRIPTION OF AN EMBODIMENT

Figure 2:
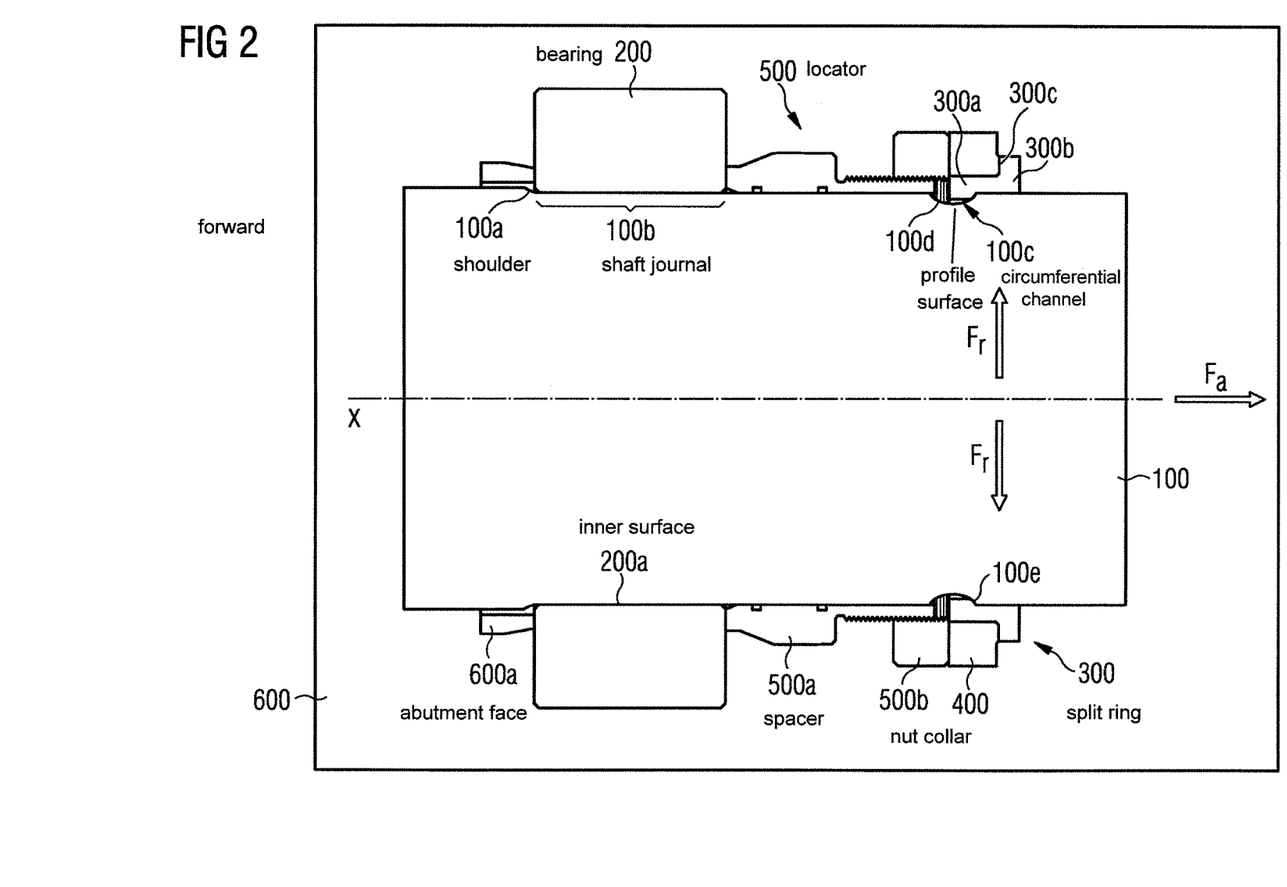
FIG. 2 shows a simplified sectional view of a bearing system according to the invention in an assembled condition.

Referring to FIG. 2, an assembled bearing system comprises: an elongate shaft 100 (only a portion of which is shown); a bearing 200; a split ring 300; a collar 400; and a bearing locator 500 including a spacer 500a and a nut 500b.

The shaft 100 is supported by the bearing 200 in a rolling mill 600 such that the shaft 100 can rotate about its longitudinal axis X. A forward portion of the shaft 100 comprises a shoulder 100a which defines a forward circumferential region of the shaft 100. A central region of the shaft 100 adjacent to the shoulder 100a comprises a shaft journal 100b which is surrounded by an inner surface 200a of the bearing 200. In this embodiment the bearing 200 is a double row angular contact ball bearing, for taking an axial thrust of the shaft 100, but could be a taper roller thrust bearing, or any other type of thrust bearing. A forward face of the bearing 200 is in contact with an abutment face 600a, for example of a spacer or a radial bearing (not shown).

Axially spaced, here rearwardly, from the journal 100b there is a groove or circumferential channel 100c. The channel 100c comprises an axially-extending profile surface which is generally inclined with respect to the longitudinal axis X of the shaft 100. In this embodiment, a forward part 100d of the profile surface (at the left part of the channel 100c in the sense of FIG. 2) is curved, and a rearward part 100e of the profile surface (at the right part of the channel 100c in the sense of FIG. 2) is linear or straight. In this embodiment, the straight, rearward part 100e of the profile surface is inclined at an angle of 30 degrees to the longitudinal axis X of the shaft 100.

The split ring 300 includes a first part 300a having a first outer diameter, and a second part 300b having a second outer diameter which is greater than the first outer diameter, so as to provide a flange having a forward face, referred to hereinafter as a thrust surface 300c. The split ring 300 surrounds the circumference of the shaft 100 in the region of the channel 100c. In this embodiment, the split ring 300 comprises two halves which are attached to one another to provide an interior surface which defines a through-bore of the split ring 300 whose diameter varies in the axial direction. In this embodiment, a first portion of the interior surface of the split ring 300 comprises a slope which is shaped to complement the inclined rearward part 100e of the profile surface of the channel 100c and is seated thereon, ensuring a good surface contact between the first portion of the interior surface of the split ring 300 and the rearward part 100e of the profile surface of the channel 100c for transmitting the axial thrust. It will be understood that the first portion of the interior surface of the split ring 300 can take any general shape and need not conform entirely with the profile surface, as long as contact with at least part of the inclined profile surface is sufficient for transmission of the axial thrust. Thus, in this embodiment, part of the first portion of the interior surface of the split ring 300 extends forwardly to overhang part of the profile surface. A second portion of the interior surface of the split ring 300 is in contact with a rearward region of the shaft 100 immediately adjacent the channel 100. Thus, the split ring 300 is partially disposed, or located, in the channel 100c.

The ring-like collar 400 includes a through-bore having a diameter which is substantially the same as the outer diameter of the first part 300a of the split ring 300. Accordingly, the collar 400 is seated snugly over the first part of the split ring 300 and a rearward face of the collar 400 is in abutment with the thrust surface 300c of the second part 300b of the split ring 300. In this embodiment, the collar 400 is of single-piece construction. Also in this embodiment the collar 400 is solid.

In this embodiment, the halves of the split ring 300 are joined together in a conventional manner by screws, or a circumferential clamp, or a pivot and bolt arrangement, as described herein above. Alternatively, since the split ring 300 may experience a small radial expansion as it is assembled on the profile surface of the channel 101c, a circumferential clamp or holding mechanism, which can be removed once the collar 400 is positioned around the split ring 300, may be preferred.

The spacer 500a is disposed around the central region of the shaft 100 and extends axially between the bearing 200 and the channel 100c. A forward face of the spacer 500a is in abutment with a rearward face of the bearing 200 and a rearward face of the spacer 500a is located at the region of the channel 100c. In this embodiment, the rearward face of the spacer 500a slightly overhangs the channel 100c. Alternatively, the rearward face of the spacer 500a may extend to the edge of the channel 100c or stop short of the edge. The spacer 500a includes an outer thread on which the nut 500b is threadably engaged. As shown in FIG. 2, the nut 500b has been screwed along the spacer 500a such that a rearward face of the nut 500b is in abutment with a forward face of the collar 400. The nut 500b has been tightened against the collar 400 so that the spacer 500a has been urged axially (leftwards in the sense of FIG. 2) to locate the bearing 200 on the journal 100b against the abutment face 600a.

When in use in the rolling mill 600, the shaft 100 produces an axial thrust which is transmitted to the first part 300*a* of the split ring 300 by the rearward part 100*e* of the profile surface of the circumferential channel 100*c*. Accordingly an axial force Fa is applied to the thrust face 300*c* which in turn transmits the force to the collar 400. The axial force Fa urges the interior surface of the first portion 300*a* of the split ring 300 to ride up along the inclined rearward part 100*e* of the profile surface of the channel 100*c*, potentially causing the split ring 300 to move axially along the shaft 100 (rightwards in the sense of FIG. 2) and causing a radial force in the split ring 300. Accordingly, the first part 300*a* of the split ring 300 exerts an outward radial force Fr on the collar 400. The snug-fitting collar 400 counters this radial force Fr to resist or contain radial displacement of the split ring 300, thereby preventing or restricting the split ring 300 from riding along the profile surface of the channel 100*c*. In this way, axial movement of the split ring 300 along the shaft 100 is prevented, or at least limited, and the bearing 200 remains correctly located on the shaft 100.

In conventional bearing arrangements, the contact face between the split ring and the groove in the shaft is 90 degrees to the longitudinal axis of the shaft and therefore there is no radial load on the split ring and so the bolts (or other devices) which hold the split ring halves together do not need to be particularly strong. In the invention, the radial load on the split ring 300 could not be contained by conventional bolts and the collar 400 is provided for this function.

The stages of assembly of the bearing system will now be described, with particular reference to FIGS. 3 to 6.

Figure 3:
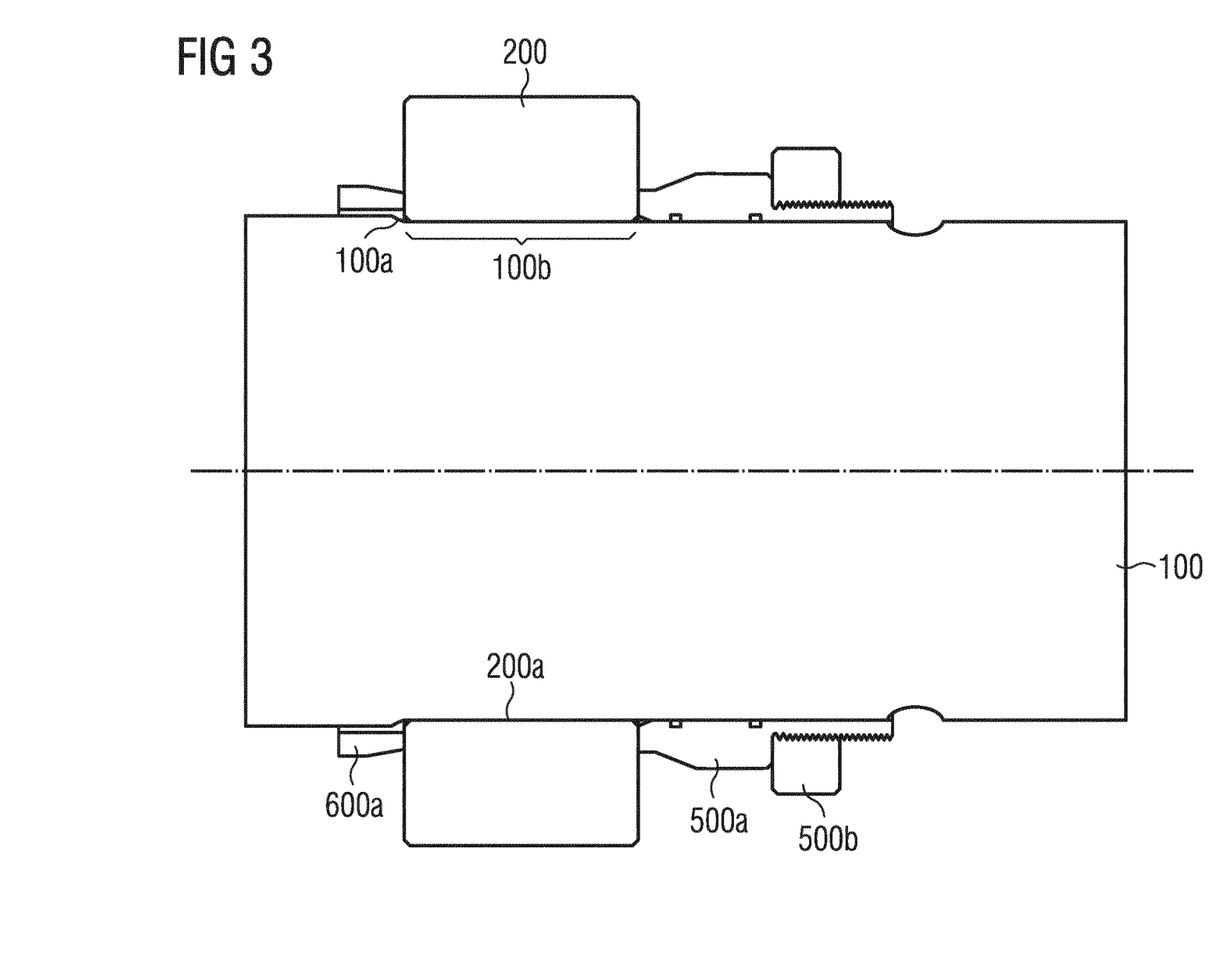
FIGS. 3 to 5 show various stages of assembly of the bearing system of FIG. 2.
Figure 6:
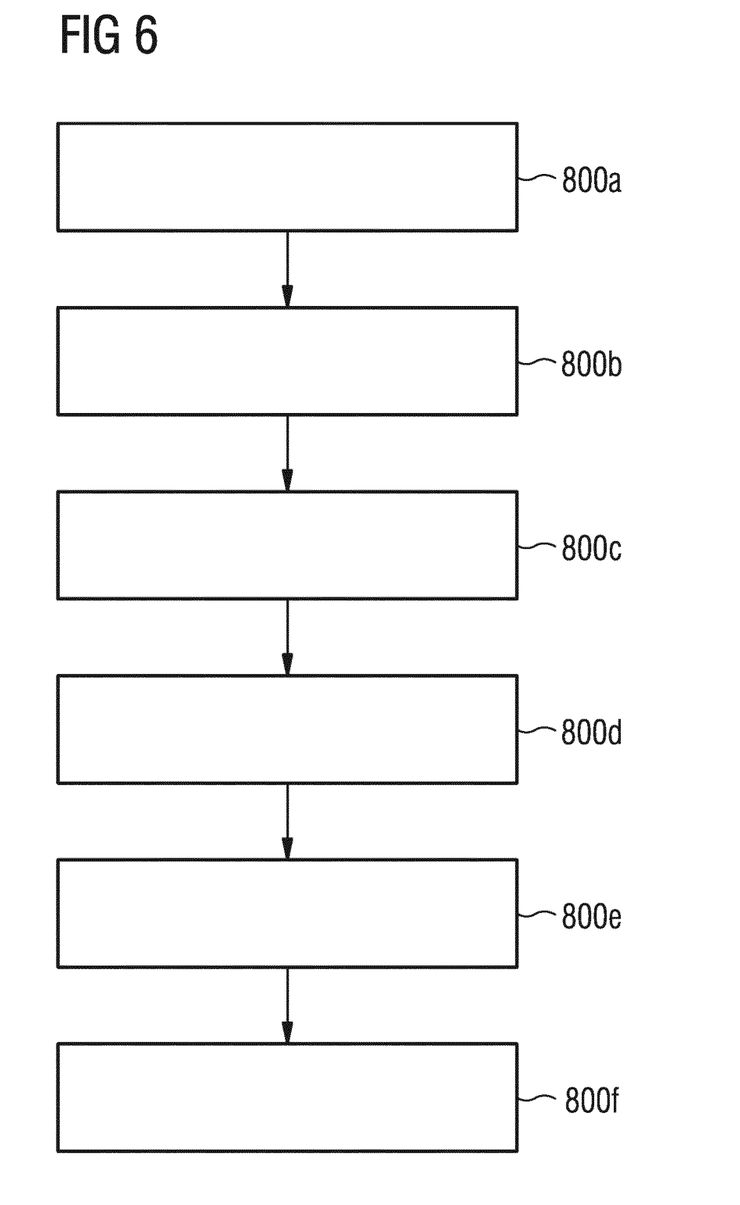
FIG. 6 illustrates a method of assembly of the bearing system of FIG. 2.

Referring to FIGS. 3 and 6, in a first assembly step 800*a* the bearing 200 is slid (from right to left in the sense of FIG. 3) onto the central region of the shaft 100 such that the forward face of the bearing 200 is brought into abutment with the abutment face 600*a*. In this condition the inner surface 200*a* of the bearing 200 encircles the shaft journal 100*b*. In a further assembly step 800*b*, the spacer 500*a* is slid onto the central region of the shaft 100 such that the front face of the spacer 500*a* is brought into abutment with the rearward face of the bearing 200. In a further assembly step 800*c*, the nut 500*b* is screwed fully onto the spacer 500*a* so as to abut a rearward flange surface of the spacer 500*a*. (Of course, the nut 500*b* could already have been screwed onto the spacer 500*a* before the spacer 500*a* was slid onto the shaft 100).

Figure 4:
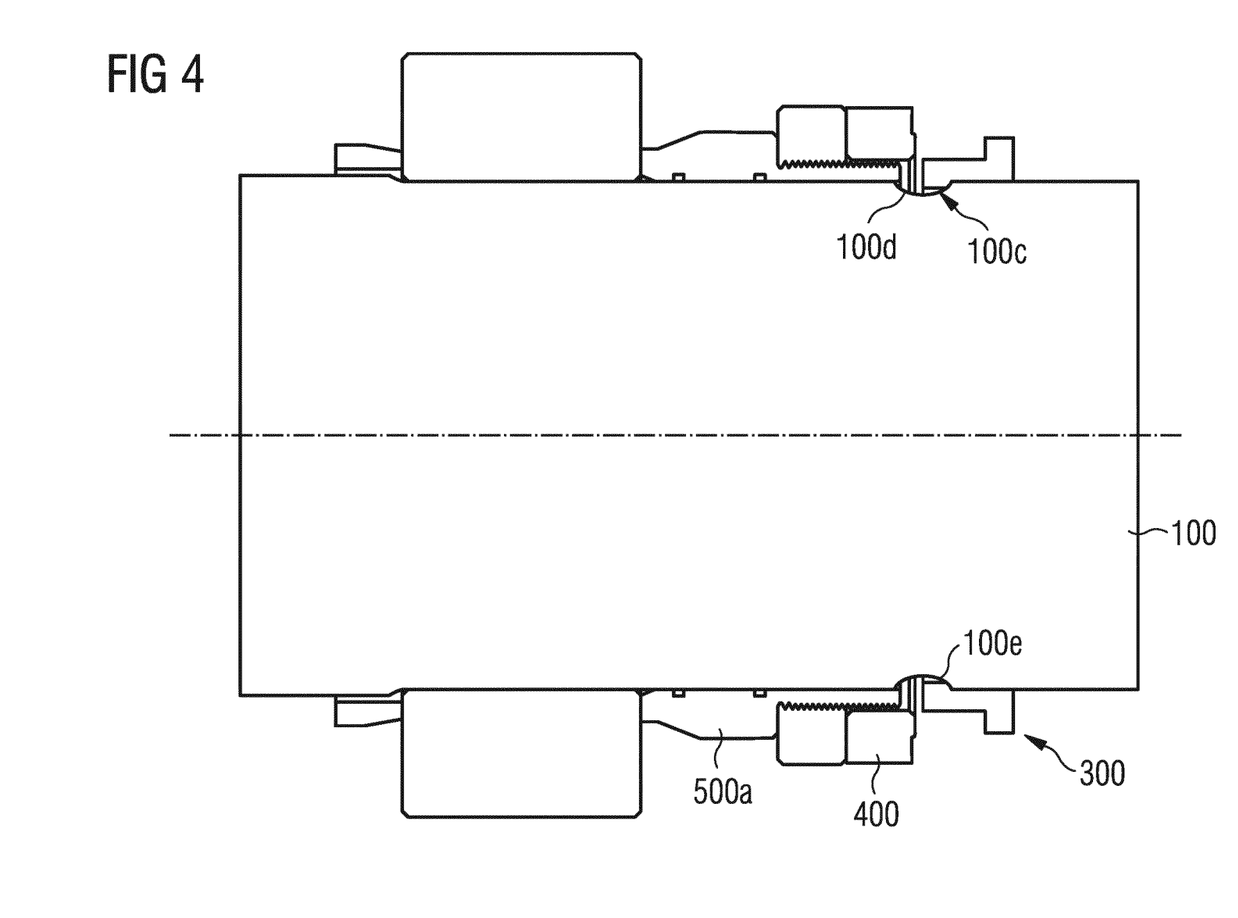

Referring now to FIG. 4, in a further assembly step 800*d* the collar 400 is positioned over the thread of the spacer 500*a*. In a further assembly step 800*e*, the two halves of the split ring 300 are positioned around the channel 100*c* and attached together such that the first portion of the interior surface of the split ring 300 is in contact with the rearward part 100*e* of the profile surface of the channel 100*c*, and the second portion of the interior surface is in contact with the rearward region of the shaft 100 immediately adjacent the channel 100. Thus, the split ring 300 is partially disposed, or located, in the channel 100*c*.

Figure 5:
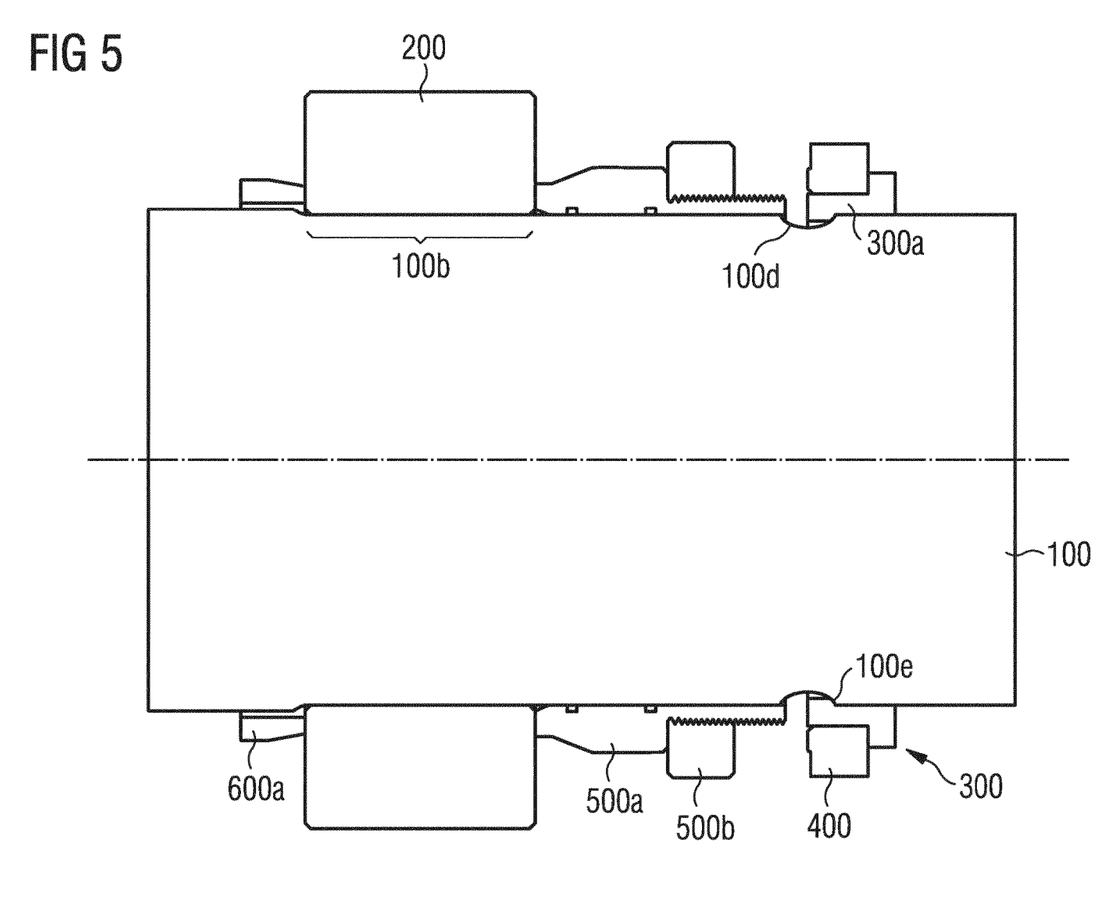

Referring now to FIG. 5 and also FIG. 2, in a further assembly step 800*f* the collar 400 is slid over the first part 300*a* of the split ring 300 and the nut 500*b* is screwed toward the collar 400 so that the rearward face of the nut 500*b* is brought into abutment with the forward face of the collar 400. As the nut 500*b* is then tightened, the split ring 300 may move a short axial distance (rightwards in the sense of FIG. 2) as the first portion of the interior surface of the split ring 300 is urged to ride along the rearward part 100*e* of the profile surface of the channel 100*c*. The axial movement of the split ring 300 is limited by the snug-fitting collar 400, which reacts against the radial expansion force applied to it by the first part 300*a* of the split ring 300 as the split ring 300 moves along the rearward surface 100*e*, thereby containing the split ring 300 and limiting its advance along the shaft 100. Further tightening of the nut 500*b* produces a reaction force which drives the spacer 500*a* axially along the shaft 100 toward the bearing 200, thereby pressing the forward face of the bearing 200 against the abutment face 600*a* to locate the bearing 200 in the correct position on the journal 100*b*. Accordingly, the bearing system is brought into the fully assembled condition shown in FIG. 2.

Figure 7A:
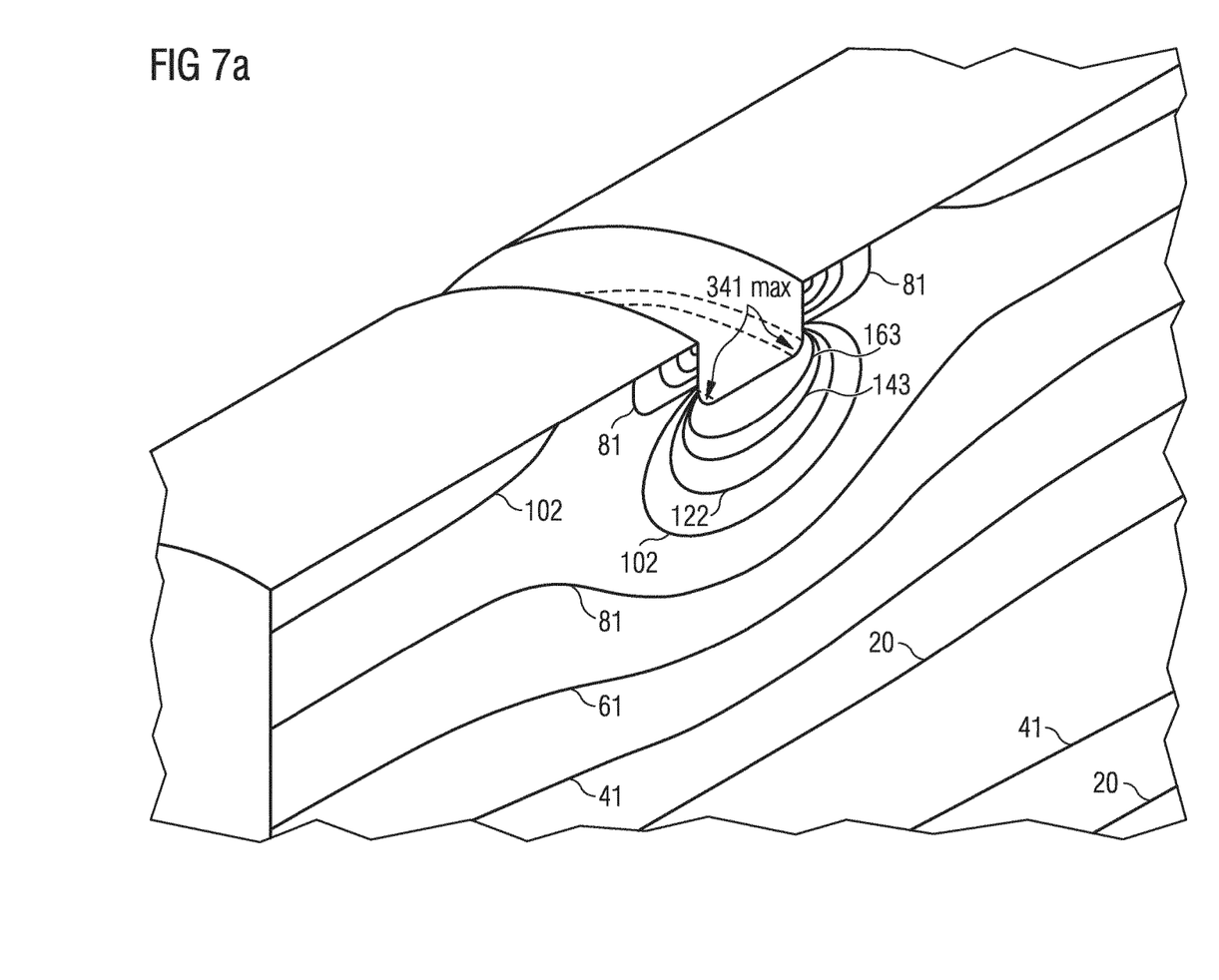
FIGS. 7a and 7b illustrate stress distributions in the conventional and inventive bearing systems respectively.
Figure 7B:
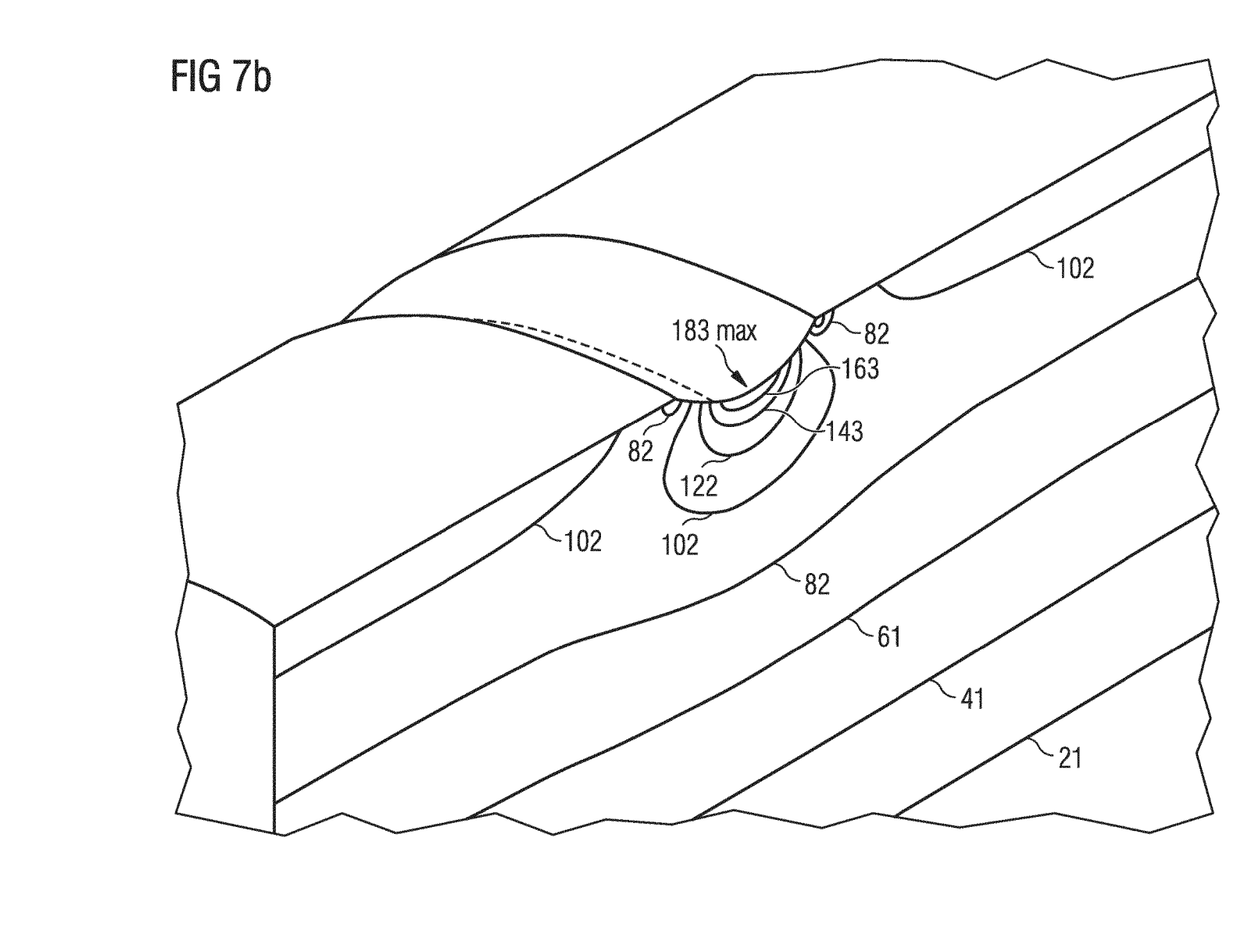

Referring now to FIGS. 7*a* and 7*b*, Finite Element Analysis (FEA) shows that the maximum von-Mises stress in a conventional bearing arrangement (FIG. 7*a*) is 353.64 MPa, whereas in an exemplary bearing arrangement according to the invention (FIG. 7*b*) the maximum is 177.48 MPa. Thus, the invention provides a stress reduction of about 50%, and thereby an improvement in the fatigue life of the shaft.

It will be understood that the invention has been described in relation to its preferred embodiments and may be modified in many different ways without departing from the scope of the invention as defined by the accompanying claims.

The invention claimed is:

1. A bearing system, comprising:
   a shaft, having a longitudinal axis about which the shaft is rotatable, a circumferential channel in the shaft comprising an axially extending profile surface, at least part of the profile surface is inclined relative to the longitudinal axis;
   a bearing configured to be disposed around the shaft in use;
   a split ring, configured to be located in the circumferential channel in use so that the split ring is in contact with the inclined profile surface, the split ring including a first part having a first outer diameter, and a second part having a second greater outer diameter than the first part so that the second part is configured to provide a thrust surface;
   a collar including an internal bore, the internal bore is configured to accommodate the first part of the split ring in use;
   a bearing locator configured to exert an axial direction locating force between the split ring and the bearing in order to locate the bearing on the shaft; and
   wherein in use, an axial thrust load exerted on the split ring by the shaft is transmitted to the collar by the thrust surface, and the split ring is urged along the inclined profile surface so as to produce a radial load on the split ring and the radial load is resisted by the collar.

2. A bearing system according to claim 1, wherein the inclined profile surface of the circumferential channel is partly straight and partly curved extending along the longitudinal axis and the curved part is curved on a transverse axis across the shaft.

3. A bearing system according to claim 1, wherein the bearing locator and the collar comprise separate elements.

4. A bearing system according to claim 3, wherein the bearing locator comprises:
   an externally threaded spacer configured to be disposed between the bearing and the circumferential channel; and
   a nut, configured to be screwed on the threaded spacer and into abutment with the collar so as to exert the axial direction locating force.

5. A bearing system according to claim 4, wherein the threaded spacer is configured such that the nut and the collar can be disposed on the threaded spacer within the axial length of the threaded spacer, so that the split ring can be located in the circumferential channel adjacent the threaded spacer on the shaft.

6. A bearing system according to claim 1, wherein the inclined profile surface of the circumferential channel comprises a straight part, extending along the longitudinal axis.

7. A bearing system according to claim 6, wherein the straight part of the profile surface is inclined from the longitudinal axis of the shaft by about 1 to 80 degrees.

8. A bearing system according to claim 1, wherein the inclined profile surface of the circumferential channel comprises a curved part extending along the longitudinal axis and curved on a transverse axis across the shaft.

9. A bearing system according to claim 8, wherein the radius of curvature is constant.

10. A bearing system according to claim 8, wherein the radius of curvature is varied.

11. A bearing system according to claim 8, wherein the profile surface, or a tangent to the profile surface, is inclined from the longitudinal axis of the shaft by about 1 to 80 degrees.

12. A method of assembling a bearing system, comprising the steps of:
providing a bearing system as claimed in claim 1, and performing the steps of:
positioning the bearing onto the shaft;
positioning the bearing locator onto the shaft;
positioning the collar over the bearing locator;
positioning the split ring at least partially in the circumferential channel;
positioning the collar over the first part of the split ring; and
adjusting the bearing locator to exert an axial locating force between the split ring and the bearing in order to locate the bearing on the shaft.

13. A method of assembling a bearing system on a shaft, comprising:
providing a shaft having a circumferential channel in it;
positioning a bearing onto the shaft;
positioning a bearing locator onto the shaft;
positioning a collar over the bearing locator;
positioning a split ring at least partially in the circumferential channel;
positioning the collar over a first part of the split ring; and
adjusting the bearing locator to exert an axial locating force between the split ring and the bearing in order to locate the bearing on the shaft.

* * * * *